Patented Aug. 21, 1928.

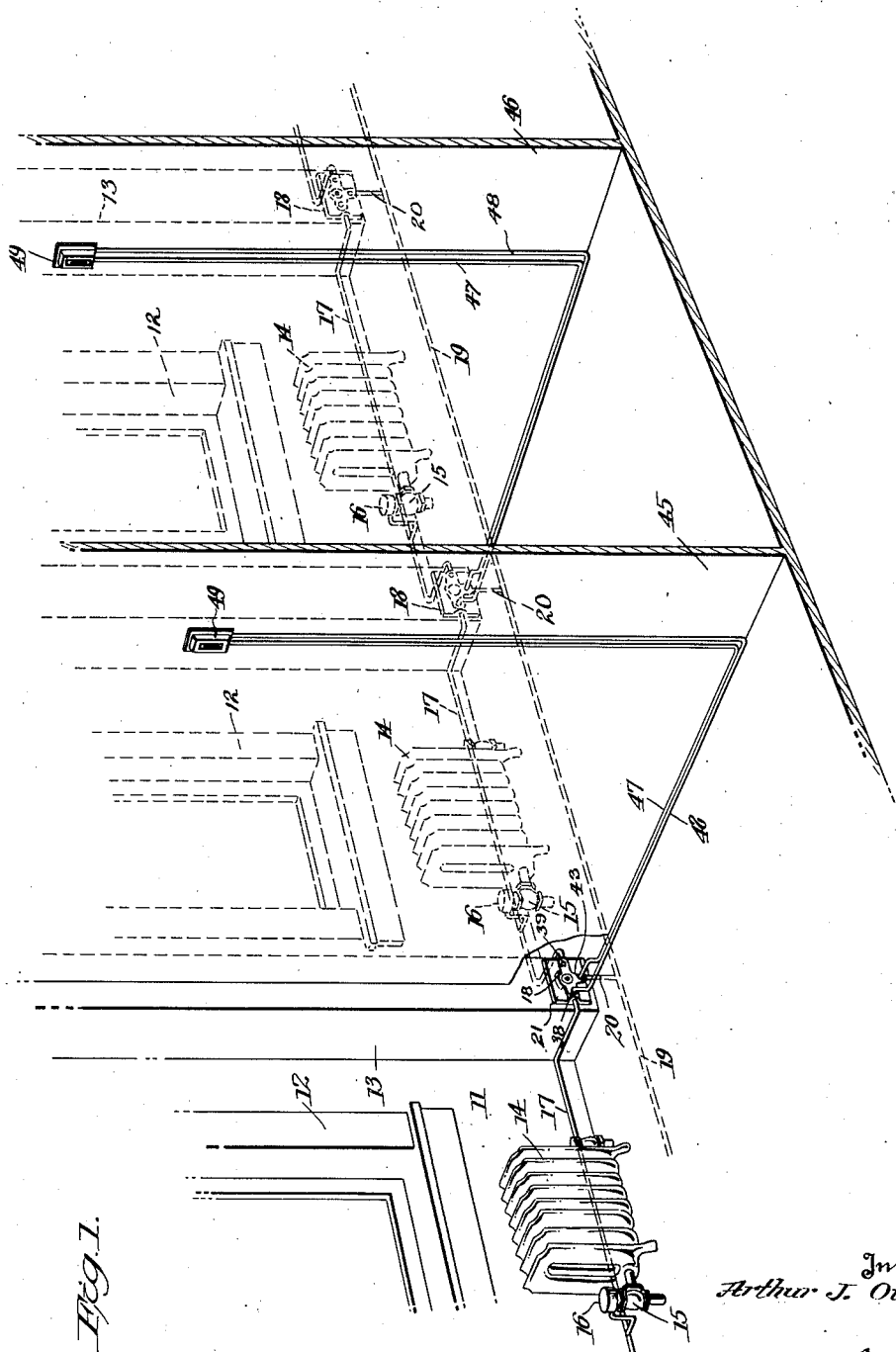

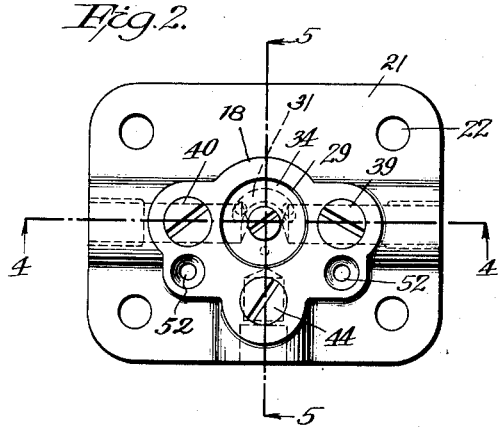
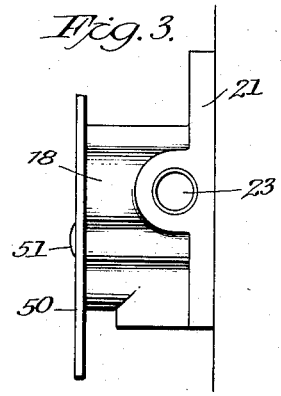
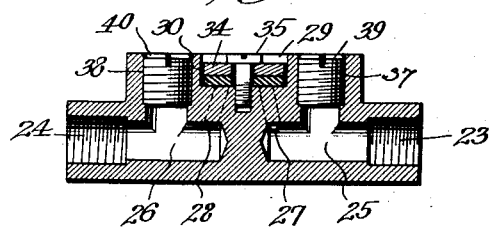
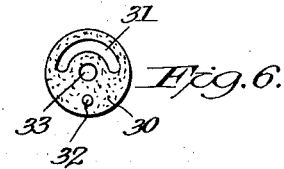
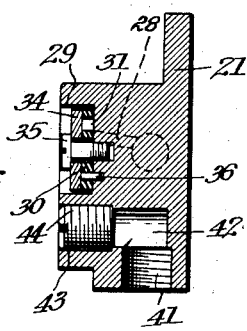

1,681,253

UNITED STATES PATENT OFFICE.

ARTHUR J. OTTO, OF MILWAUKEE, WISCONSIN, ASSIGNOR TO JOHNSON SERVICE COMPANY, OF MILWAUKEE, WISCONSIN, A CORPORATION OF WISCONSIN.

TEMPERATURE REGULATION.

Application filed January 26, 1927. Serial No. 163,801.

This invention relates to temperature regulation and particularly to systems of the pressure fluid or pneumatic motor type.

In modern office and manufacturing buildings occasional changes in the subdivision of space are contemplated and are provided for in the design of the buildings to the extent that the planes of subdivision are quite definitely determined. Where such buildings are equipped with automatic temperature regulation of the pressure fluid motor type changes in subdivision of space have required radical changes of control piping entailing undesirable delay, expense and interruptions of service.

The object of the present invention is to provide a special system of piping including a special form of connecting fitting, which will obviate any change in permanent piping, and permit a series of radiators to be changed from joint control by a single thermostat, to individual control by corresponding thermostats, or vice versa, without delay.

Generally stated, all the bellows motors which control the radiator valves of a floor, bay, wing, or other unit likely to be subdivided, are connected to a continuous control-pipe line. Paralleling this line is a pressure fluid supply line. Between radiators in each plane of probable subdivision of space (i. e., in the plane of partitions, actual or possible) a special fitting is interposed in the control pipe line. This fitting is equipped with adjustable valve or equivalent means by which the portions of the control line at opposite sides of the fitting may be connected with or isolated from each other. The fitting also includes pipe connections affording connection to the control line, one offering connection to the line at one side of the fitting and the other to the line at the other side of the fitting. In some cases one such connection per fitting would suffice. When not connected to the controlling line of a thermostat the connections above mentioned are plugged. A branch from the supply line leads to each fitting and supplies a pipe connection which is either plugged or connected to the supply line of a thermostat.

The fittings permit the utmost flexibility of control arrangement. Any number of radiators can be controlled by a single thermostat or divided into units consisting of one or more radiators, each unit controlled by a thermostat. Where partitions are used on the planes of subdivision between units, as is ordinarily the case, the thermostat for each unit may be located on either partition (provided the fitting be of the preferred form having a connection to the control line at each side of the fitting). All that need be done is to subdivide the control line by adjusting the fitting so as to isolate from each other adjacent portions of the control line, and then to connect thermostats appropriately to the supply and control connections offered by the fittings. If the partition is later removed the thermostat is disconnected, the thermostat connections on the fitting are plugged and the fitting is adjusted to connect the two adjacent portions of the control line.

A preferred embodiment of the invention is illustrated in the accompanying drawing, in which Fig. 1 is a perspective view showing the connections to three room spaces each having a radiator.

Fig. 2 is a front elevation of the fitting used, with the cover plate removed.

Fig. 3 is a side elevation thereof with the cover plate in place.

Fig. 4 is a section on the line 4—4 of Fig. 2.

Fig. 5 is a section on the line 5—5 of Fig. 2.

Fig 6 is a detail view of the reversible gasket.

Referring first to Fig. 1, the outside wall of the building is indicated at 11 and windows at 12. Between successive windows are pilasters 13 which are characteristic of modern concrete building construction, and which in such construction accurately define the location of subdividing partitions. Such partitions, of a more or less permanent construction, are installed and removed as desired by the tenants.

Under each window 12 there is located a radiator 14, which is controlled by a radiator valve 15 actuated by a bellows diaphragm or other pressure motor 16. Pressure fluid is admitted to and exhausted from the bellows motor by a control line 17 which is connected to the motors 16 of all the radiators. The control line 17 is continuous except that it passes through a fitting, indicated generally by the numeral 18, one such fitting being mounted on each pilaster 13, that is, in the plane of each existing or future partition.

Paralleling the control line 17 is a pressure fluid supply line 19 which conveniently is concealed in the floor. Branches 20 lead from the pipe 19 to each of the fittings 18, connections being made as hereinafter described.

Referring now to Figs. 2 to 6 inclusive, the fitting 18 will be described in detail. This fitting is supported by an attaching plate 21 having holes 22 for attaching screws. There are threaded pipe connections 23 and 24 to which sections of the control pipe 17 are connected. The connection 23 leads to a chamber 25 and the connection 24 to a chamber 26 from which extend branch passages 27 and 28 which open into the bottom of a recess 29 formed in the front of the fitting. In this recess is mounted a sealing gasket 30 (see Fig. 6) which is formed with an arcuate slot 31, a hole 32 and a central aperture 33. Overlying the gasket 30 is a washer 34. A screw 35 passing through the washer and the gasket and threaded into the body of the fitting 18, clamps the washer in position and seals both flat faces thereof. In one position the hole 32 receives a positioning pin 36 fixed in the body of the fitting 18, and when so positioned the slot 31 connects the ends of the passages 27 and 28 with each other. By removing the screw 35 and washer 34, the gasket 30 may be reversed so that it blanks the connection between the passages 27 and 28. Thus by merely reversing the gasket 30, it is possible to connect the pipe connections 23 and 24 with each other or to isolate them from each other at will.

The gasket and washer device serves as an inexpensive valve means which will remain tight indefinitely and hence is preferred, but any equivalent valve device might be substituted.

Terminating in the front face of the fitting are two pipe connections 37 and 38, the first of which permits the connection of the controlling line of a pneumatic thermostat to that portion of the control line 17 which is connected at 23, and the second of which performs the same function with the portion of the line 17 connected at 24. When not connected with thermostats they are plugged by means of threaded plugs 39 and 40, as shown in Figs. 2 and 4.

The branch pipe 20 from the supply line is connected to a threaded connection 41 in the lower face of the fitting 18 and this is connected by way of passage 42 to the threaded connection 43 on the front face of the fitting. The connection 43 affords means for connecting a pressure fluid supply line for a thermostat, and when not in use is sealed by a plug 44.

Where a series of radiators are connected up to be controlled by a single thermostat, the fittings 18 between such radiators have the plugs 39, 40 and 44 in place and the gasket 30 so positioned that the sections of the lines 17 are connected with each other, forming one continuous line connection to all the motors of the radiators in the group.

Assuming now that it is desired to install two partitions, such as those indicated at 45 and 46, in Fig. 1, the gasket 30 is reversed in each of the corresponding two fittings 18, i. e., the fittings on the planes of the two partitions. It being assumed that the thermostats are to be installed in each case on the right hand partition as one faces the window, the plugs 40 and 44 are removed and thermostat supply line 47 is connected to the connection 43 in place of the plug 44 and the thermostat control line 48 is connected to the connection 38 in place of the plug 40. A thermostat 49, of the pneumatic type, for example one of the type illustrated in the patent to Johnson, No. 1,109,993, September 8, 1914, is then installed on the partition 45. This thermostat, as is well understood in the art, functions to admit air from the pipe 47 to the pipe 48 when the heat is to be cut off, and when the heat is to be turned on to terminate the admission of air and vent the pipe 48 to atmosphere. Upon the installation of the thermostat, each thermostat 49 controls the radiator 14 in the room with it.

It will be obvious to those skilled in the art that if it had been desired to install the thermostats 49 on the left partition walls, as one faces the window, the pipes 48 would be connected to the connections 37 instead of the connections 38, connection in each instance being made to a fitting in the plane of the partition which carries the thermostat.

The purpose of using two connections 37 and 38 on a single fitting is to give this choice in the location of the thermostat, but, obviously, if it is feasible to restrict the location of the thermostat to a given side of the room a fitting having only one of the connections 37 or 38 would suffice. The double arrangement, because of its greater flexibility, is preferred.

In order to protect the front of the fitting, in cases where it is mounted beneath the plaster of the wall, the cover plate 50 is used. This is retained by screws 51 which enter tapped holes 52 in the body of the fitting 18.

The invention is susceptible of embodiment in various specifically different forms and may be used with any type of thermostat which operates to admit and exhaust pressure fluid to and from a heat controlling motor. While I have shown radiators, it will be understood that these are merely typical of any local controllable heating means. Most pressure fluid thermostats operate by air pressure. The particular pressure fluid is not material.

In its broadest aspect, the fitting consists of six pipe-receiving connections, such connections being connected together in pairs, and there being some means which may be manipulated to connect two of such pairs with each other, or to isolate them from each other. It is also apparent that in the broader aspects of the invention, it is not strictly essential that the connections 41 and 43 be in the same unitary structure with the remaining connections provided some means be afforded for permitting ready connection with the pressure supply line 19 at or near the plane of space subdivision. Obviously a construction in which a single unitary fitting is used, is simpler and better from the standpoint of installation.

What is claimed is,—

1. In a heat regulating system, the combination of a plurality of heat controlling pressure motors; a motive fluid conducting line connected with each such motor; at least one device interposed in such line between motors, such device including means operable at will to connect or isolate from each other the portions of said line on opposite sides of said device, and said device further including means for connecting a pressure fluid controlling thermostat releasably in controlling relation with said line.

2. In a heat regulating system, the combination of a plurality of heat controlling pressure motors; a motive fluid conducting line connected with each such motor; at least one device interposed in such line between motors, such device including means operable at will to connect or isolate from each other the portions of said line on opposite sides of said device, and said device further including means for connecting a pressure fluid controlling thermostat releasably in controlling relation with the portion of the control line at one or the other side of the point of isolation, selectively.

3. In a heat regulating system, the combination of a plurality of heat controlling pressure motors; a motive fluid conducting line connected with each such motor; a motive fluid supply line paralleling said conducting line; and at least one device interposed in said conducting line between motors, and connected with such supply line without connecting said lines with each other, each device including means operable at will to connect or isolate from each other the portions of said conducting line on opposite sides of the device, together with means for connecting a pressure fluid controlling thermostat releasably in operative relation with both said lines.

4. In a heat regulating system, the combination of a plurality of heat controlling pressure motors; a motive fluid conducting line connected with each such motor; a motive fluid supply line paralleling said conducting line; and at least one device interposed in said conducting line between motors, and connected with such supply line without connecting said lines with each other, each device including means operable at will to connect or isolate from each other the portions of said conducting line on opposite sides of the device, together with means for releasably connecting a pressure fluid controlling thermostat in operative relation with the supply line and selectively with the portion of the conducting line to either side of the point of isolation in said device.

5. A fitting for use in heat regulating systems comprising a body having two control passages each terminating at one end in a motor connection and at the other end in a thermostat connection; adjustable means for connecting said passages with each other or isolating them from each other at will; and means for blanking said thermostat connections.

6. A fitting for use in heat regulating systems, comprising a body having a supply passage terminating at one end in a supply line connection and at the other end in a thermostat connection, and two control passages each terminating at one end in a motor connection and at the other end in a thermostat connection; adjustable means for connecting said control passages with each other or isolating them from each other at will; and means for blanking said thermostat connections.

7. A fitting for use in heat regulating systems comprising a body having six pipe connections communicating with each other in pairs, and means for connecting one of said pairs with another of said pairs, or isolating it therefrom at will.

8. A fitting for use in heat regulating systems comprising a body having at least four pipe connections communicating with each other in pairs; and means for connecting one pair with another or isolating it therefrom at will.

9. A fitting for use in heat regulating systems comprising a body having at least four pipe connections communicating with each other in pairs, and a ported seat interposed in a connection between two such pairs; a member reversible on said seat alternatively to obstruct or open the port therein; and means for fixing said member in either position.

In testimony whereof I have signed my name to this specification.

ARTHUR J. OTTO.